United States Patent Office 3,745,004
Patented July 10, 1973

3,745,004
PHOTODECOMPOSITION OF DIAZASUCCINIC AND SIMILAR ANHYDRIDES
Arnold Zweig, Westport, and William Arthur Henderson, Jr., Stamford, Conn., assignors to American Cyanamid Company, Stamford, Conn.
No Drawing. Filed July 9, 1971, Ser. No. 161,314
Int. Cl. G03c 1/52
U.S. Cl. 96—49
6 Claims

ABSTRACT OF THE DISCLOSURE

A system for storage of information and color photography comprising the use of a dye precursor capable of photochemical conversion to a permanent visible image under light of a particular wavelength is provided, said material being an anhydride of an aromatic substituted heterocyclic compound.

---

This invention relates to information display and image formation by radiation and visual techniques. It more particularly relates to a system for forming a visual image in a colorless material by converting the material to a visible dye by light irradiation and detecting the image visually or photometrically. Still more particularly it relates to the use of a class of aromatically substituted heterocyclic compounds which undergo photochemical conversion to produce intense colored azo dyes.

Information display and image formation systems are of rapidly increasing importance in the present day economy in view of the exponential rise in the number and complexity of the data which must be recorded to handle the increasing everyday business load, and to assist in scientific developments.

A systems for storing and displaying information is disclosed herein which comprises the following: a colorless material X, capable of photoconversion to a material Y which has an absorption band in the visible region. In the present invention formation of a permanent image is effected rapidly, accurately and with no fixing being required.

A new group of compounds is disclosed suitable for the above mentioned system which undergo photoconversion to intensely colored azo dyes. These are aromatically substituted heterocyclic anhydrides which undergo a photochemical decarboxylation and decarbonylation in accordance with the following equation:

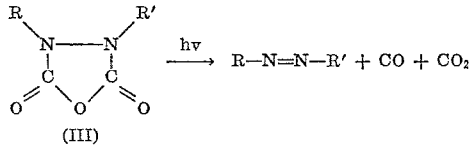

(III)

Thus efficient photochemical generation of chromophores takes place through unimolecular reaction. No other unimolecular method is known for generating azo dyes from an uncolored precursor. The well known "Diazo' 'process requires bimolecular reactions and requires fixing, and thus suffers from intrinsic disadvantages over the present invention.

As many hundreds of azo dyes are known (cf. "Synthetic Dyes," vol. 1 by Venkataraman) varying in color from yellow to black, it will be apparent to one skilled in the art that any of these azo compounds can be reduced to the corresponding hydrazo compounds and derivatized in the manner described herein. Further variations in color may be achieved through use of polyazo compound in this procedure and through photogeneration of the azo compound in the presence of metal ions such as copper, zinc and the like, which do not complex with the diaza-succinic anhydride but which are known to complex with azo dyes.

Particular anhydride which are specifically encompassed in this invention and represented by the Formula III are: those wherein R and R' are as follows:

| R | R' |
|---|---|
| (1) α-Naphthyl | ① ② ③ ④ ⑤ ⑥ ⑨ ⑦ ⑧ |
| (2) B-Naphthyl | ② ③ ④ ⑤ ⑥ ⑨ ⑦ ⑧ |
| (3) p-Aminophenyl | ③ ⑦ ⑨ |
| (4) p-Dimethylaminophenyl | ⑤ ⑥ ⑦ ⑨ |
| (5) 1-(4-hydroxynaphthyl) | ⑥ ⑦ ⑨ |
| (6) 1-(2-hydroxynaphthyl) | ⑦ ⑨ |
| (7) p-Natiophenyl | ⑧ |
| (8) 2,4-diaminophenyl | ⑨ |
| (9) Phenyl | ⑨ |

The numbers of R' represent preferred combinations with R. However, any combination of R and R' is applicable for the present invention.

In particular, the anhydride compound diphenyl diazasuccinic anhydride undergoes the typical reaction as follows:

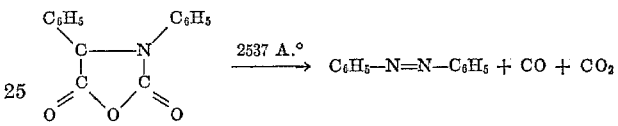

The radiant source may be of various types providing ultraviolet radiation including lamps, electric arcs, or ultraviolet lasers. The image can be formed in any well known manner as by focusing a radiant beam, projecting a beam through a stencil, by use of moving mirror systems with lasers and the like. Detectable color is obtained by exposure for less than a second.

It will be understood that information formed may be of any desired type, that is, alphanumeric characters, code markings such as dots or lines, or pictorial information.

In the present invention, storage of information is rapid, accurate and dry, no fixing being required. Retrieval is rapid, exceptionally sensitive and accurate and is not accompanied by degradation. The inventive technique combines photochemical deposition of information, allowing fine resolution, with detection by photometry. As mentioned, no fixing is required where the dye precursor is only sensitive to light of wavelength of less than 290 mµ.

An advantage of the present system is that any portion or entire cards or documents can be treated with dye precursor material X, after which particular information may be put on the treated part by light projection. It will be apparent, therefore, that many cards may be produced, with individual information placed thereon at a later time, by conversion of the desired image portion to a visible Compound Y. Detection is preferably, as previously indicated, by eye or machine reading using instruments such as a tristimulus color photometer or colorimeter. The detecting radiation is of such wavelength that it does not convert any of the remaining Material X to Material Y.

The present material has a further characteristic that the amount of detectable color is proportional to the amount of visible color which has been converted to the colored state. The amount converted on any radiated area depends on the duration of time of exposure to the irradiating energy. The longer the time period is, the more visible color there will be converted per unit of exposed area and thus the more intense the image upon subsequent detection. This characteristic makes it possible to produce detectable tone variations over a given area. This is much like the tone variation in a photographic negative or a magnetic sound tape. Thus the present invention could be used to prepare a sound tape by audio modulation of the radiant source. The sound is detectable by conventional color detection means coupled to audio output means by a suitable transducer.

While the converted colored information cannot be optically reconverted to the anhydride non-colored state which would give an erase capability, it would be possible to insert new information and create another word or number adjacent thereto in visual precursor material X. This, of course, is limited to the area of the object which has been treated with due precursor material X.

The dye precursor Material X may be coated on any desired substrate such as paper, glass, wood, plastic, cloth, leather, and the like, or it may be incorporated in transparent or opaque plastic films. The substrate may be of any configuration, i.e., sheets, belts, discs, drums, three dimensional objects, such as bottles, boxes, and the like. Techniques for this will be readily apparent to persons skilled in the art. It will be obvious that choice of materials may depend on the particular intended use.

The dye precursor Material X may be any anhydride as described above which has the desired properties, that is, it has a colorless form which absorbs light, or heat, to be converted to an intensely colored dye.

The diazasuccinic anhydrides are prepared according to the following reactions:

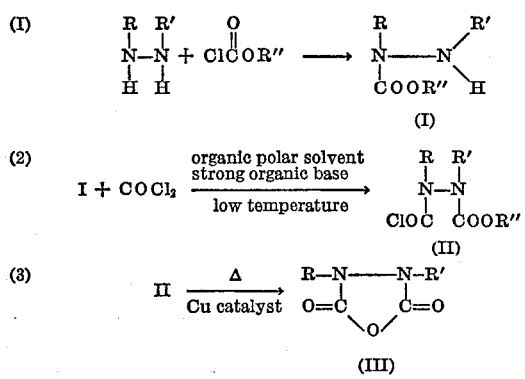

Compound I was prepared according to the method described by C. D. Hurd and F. F. Cesark, J. Amer. Chem. Soc., 89, 1417 (1967).

In the reactions, R and R' are as previously defined, and R" is a lower alkyl group.

The starting materials for Equation 1 are well known. Moreover, they can be prepared by hydrogenation of azo dyes, such as those listed in "Synthetic Dyes" vol. 1, Venkataramen (Academic Press.) In this way, the azo dye precursor can be made from the compound which will eventually be photogenerated during the imaging process. It is, therefore, possible and very easy to obtain the exact imaging material desired.

The acid chloride II is obtained by reaction of I as shown in Equation 2 with an excess of phosgene in a nonaqueous highly polar organic solvent and an excess of a strong organic base at a temperature of from about $-30°$ C. to room temperature, preferably 0° C. to 10° C.

Suitable strong organic bases are amine bases, alkoxide bases, carbanionic bases and the like.

The following classes of compounds exemplify nonaqueous highly polar organic cosolvents. These examples are, of course, nonlimiting since it will be immediately obvious that other solvents of these classes are substantially equivalent although some will be preferred over others due to a greater degree of solubility, etc. Mixtures of two or more of these solvents may likewise be employed.

Trialkyl borates: trimethyl borate, triethyl borate ($(C_2H_5O)_3B$, etc.:
Nitro alkanes: nitromethane, nitroethane, etc.;
Alkylnitriles: acetonitrile, propionitrile, isobutylronitrile, pivalonitrile, etc.;
Dialkyl amides: dimethylformamide ($(CH_3)_2NCHO$, diethylformamide, etc.;
Lactams: N-methylpyrrolidinone also described as N-methyl-$\gamma$-butyrolactam, N - methyl-$\beta$-propiolactam, N-methyl-$\alpha$-valerolactam, etc.;
Tetraalkyl ureas: tetramethylurea ($(CH_3)_2NCON(CH_3)_2$, etc.;
Acetals: dimethylacetal $CH_3CH(OCH_3)_2$, etc.;
Ketals: 2,2-dimethoxypropane $(CH_3O)_2C(CH_3)_2$, etc.;
Monocarboxylic acid esters: ethylacetate, ethylbutyrate, etc.;
Orthoesters: trimethylorthoformate $HC(OCH_3)$, triethylorthoacetate $CH_3C(OC_2H_5)_3$, etc.;
Lactones: $\gamma$-butyrolactone, $\gamma$-valerolactone, etc.;
Dialkyl carbonates: dimethyl carbonate, diethyl carbonate etc.;
Alkylene carbonates: ethylene carbonate, propylene carbonate, etc.;
Orthocarbonates: tetramethyl orthocarbonate, etc.

Compound II is stable to 150° C. and yields no anhydride on higher heating. However, in the presence of a copper catalyst, such as cupric acetate or cuprous bromide, heating produces the anhydride, compound III. The amount of catalyst is from 0.01 to 0.20 that of compound II by weight.

The diaryldiazasuccinic anhydride may be produced with substituted aryl groups in two different ways. First, the starting material itself may have the desired aryl substituents which are not altered by the steps of the reaction. Or alternatively, the anhydride may be formed from an unsubstituted starting material to form, for example, diphenyldiazasuccininc anhydride. This anhydride may then be submitted to the desired substitution reaction without adverse effect on the anhydride compound. Such substitution reactions are well known and include nitration, halogenation, acylation, alkylation, and the like.

The invention will be further described and illustrated by the following specific examples which are representative of the wide variety of photosensitive chromones provided thereby, unless otherwise stated, parts are by weight.

EXAMPLE I

Ethyl 1,2-diphenyl-1-chloroformylhydrazine-2-carboxylate

To a solution of 10.4 g. (40 mmoles) of ethyl diphenylhydrazinecarboxylate and 10.1 g. (100 mmoles) of triethylamine in 100 ml. of dry acetonitrile was added slowly with stirring at 0° under a Dry Ice® trap 20 ml. (100 mmoles) of phosgene. A white precipitate formed during the addition. The mixture was warmed slowly to room temperature and stirred for 18 hours. The solvent was removed under vacuum and the residue extracted with 200 ml. of hexane. The hexane solution was concentrated and then cooled to precipitate the product as a viscous oil.

The amide derivative formed by heating the above with p-bromoaniline was recrystallized from methanol to give fine, white crystals, M.P. 137–138°.

Analysis—Calcd. for $C_{22}H_{20}N_3O_3Br$: C, 58.16%; H, 4.44%; N, 9.25%; MW, 453. Found: C, 57.89%; H, 4.61%; N, 9.16%; m/e, 453.

EXAMPLE II

Diphenyldiazasuccinic anhydride

An intimate mixture of 40 mmoles of the above acid chloride and 1.00 g. of anhydrous cupric acetate was heated with stirring at 115° for 90 minutes, after which time the evolution of ethyl chloride (identified by its IR spectrum) had slowed considerably. The mixture was extracted twice with stirring with 200 ml. of boiling hexane. On cooling, the hexane precipitated the product as tan crystals. These were recrystallized from benzene-hexane to give 3.40 g. (34%) of white needles, M.P. 111–112°.

*Analysis.*—Calcd. for $C_{14}H_{10}N_2O_3$: C, 66.13%; H, 3.96%; N, 11.02%; MW, 254. Found: C, 65.88%; H, 4.12%; N, 10.78%; m/e, 254 with fragment peaks for loss of $CO_2$ and then CO.

The infrared spectrum (Nujol® mull) shows peaks at 1840 and 1780 cm.$^{-1}$ (anhydride C=O), 990 cm.$^{-1}$ (C—O) and phenyl absorption. The ultraviolet spectrum (hexane) shows peaks at 234 m$\mu$ (log $\epsilon$ 4.20), 266 sh. (3.08) and 274 sh. (2.83).

EXAMPLE III p-Nitrodiphenyldiazasuccinic anhydride

To a solution of 100 mg. (0.40 mmole) of the anhydride II in 1.5 ml. of acetic anhydride was added dropwise at 0° 0.20 ml. of fuming nitric acid in 0.50 ml. of acetic anhydride and 0.50 ml. of acetic acid. The solution was allowed to stand overnight, after which the solvent was evaporated at low pressure to leave an oil. This was taken up in hexane from which it crystallized on standing for three weeks to give pale yellow plates, M.P. 136–138 (decomp.).

*Analysis.*—Calcd. for $C_{14}H_9N_3O_5$: C, 56.19%; H, 3.03%; N, 14.04%; MW, 299. Found: C, 55.90%; H, 3.17%; N, 13.98%; m/e, 299.

The infrared spectrum (Nujol® mull) shows anhydride peaks at 1860 and 1780 cm.$^{-1}$. The ultraviolet spectrum (ethanol) shows peaks at 318 m$\mu$ (log $\epsilon$ 4.04) and 288 (4.26).

EXAMPLE IV

Irradiation of diphenyldiazasuccinic anhydride (III)

Irradiation of III with 254 m$\mu$ light in hexane or ethanol gave mixtures of cis and trans azo benzene. A multi-component spectroscopic analysis of the reaction mixtures was set up taking advantage of the isosbestic point for the conversion of cis to trans azobenzene at 268 m$\mu$ and using the following parameters.

| Compound | $\epsilon_{268}$ | $\epsilon_{315}$ |
|---|---|---|
| III | 1,400 | 0 |
| cis-Azobenzene | 5,100 | 1,100 |
| trans-Azobenzene | 5,100 | 22,000 |

From the above, the Equations 4 and 5 were derived where $c$ and $t$ denote the concentrations of cis and trans azobenzene, respectively, $$c+t = d_{268}/3.700 \quad (4)$$

$$\Delta d_{315} = 1,100c + 22,000t \quad (5)$$

These equations were checked by using them to determine the cis to trans ratio $c/c+t$ obtained on irradiation of trans azobenzene in hexane. The experimental values and the results are given below.

| $\lambda$ of exciting light | Expl.$^{c/c+t}$ | Liter$^4$ |
|---|---|---|
| None | 0.02 | |
| 254 m$\mu$ | 0.11 | 0.08 |
| 313 m$\mu$ | 0.79 | 0.80 |

Finally, solution of II in hexane were irradiated with 254 m$\mu$ light and analyzed as above. The $c/c+t$ ratio extrapolated to zero time is 0.88. The quantum yield for formation of azobenzene is 0.15. The final $c/c+t$ ratio was 0.11. The rate at which cis azobenzene is converted to trans is lower for high concentrations of II. The trans azobenzene was isolated by chromatography and identification was varified by its UV and IR spectra and melting point.

EXAMPLE V

Two solutions prepared as follows:

| Solution 2: | Percent |
|---|---|
| Anhydride of Example II | 5 |
| Copolymer | 95 |

A copolymer of polyvinyl chloride and polyvinylidine chloride from Goodrich Rubber Company (Geon 222).

| Solution: | Percent |
|---|---|
| Anhydride of Example III | 5 |
| Copolymer | 95 |

A copolymer of polyvinyl chloride and polyvinylidine chloride from Goodrich Rubber Company (Geon 222).

Solution 1 was coated on white paper stock at a thickness of 0.3 mil.

Solution 2 was coated on the same type paper at approximately the same thickness, 0.4 mil.

The coated papers were exposed to varying intensity irradiation from a mercury light (H—100 mercury light, 2537 A.). Detectable red color characteristic of the resulting azo compound was obtained in about thirty seconds of exposure. Longer exposure produced more intense color.

While certain specific examples and preferred modes of operation has been set forth, it will be obvious that this is solely for illustration and that various changes and modifications may be made in the invention without departing from the spirit of the disclosure and the scope of the appended claims.

We claim:

1. A method for processing information which comprises irradiating, with an information containing beam of light of a given wavelength, a material containing dye precursor aromatic substituted diazasuccinic anhydride compounds which are colorless in their initial state, said light of a given wavelength to a state in which they form a colored image.

2. The process of claim 1 wherein said compound is converted by heat energy.

3. The method of claim 1 wherein said light of a given wavelength is ultraviolet light of less than about 2900 A. wavelength.

4. The method of claim 1 wherein said dye precursor is a mixture of compounds.

5. The method of claim 1 wherein the dye precursor is applied to a surface as the initial step of the imaging process.

6. A composition comprising an anhydride as in claim 1 in a liquid carrier.

References Cited

JACS 89 1417 (1967).

NORMAN G. TORCHIN, Primary Examiner

J. L. GOODROW, Assistant Examiner

U.S. Cl. X.R.

96—90 R, 75